(12) United States Patent
Zhu et al.

(10) Patent No.: US 10,989,695 B2
(45) Date of Patent: Apr. 27, 2021

(54) ONLINE MONITORING SYSTEM FOR CRACK ON HOIST SPINDLE AND OPERATION METHOD THEREOF

(71) Applicant: China University of Mining and Technology, Jiangsu (CN)

(72) Inventors: Zhencai Zhu, Jiangsu (CN); Hao Lu, Jiangsu (CN); Shuang Cao, Jiangsu (CN); Yuxing Peng, Jiangsu (CN); Gongbo Zhou, Jiangsu (CN); Guohua Cao, Jiangsu (CN); Gang Shen, Jiangsu (CN); Wei Li, Jiangsu (CN); Dagang Wang, Jiangsu (CN); Fan Jiang, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 16/760,040

(22) PCT Filed: Jul. 1, 2019

(86) PCT No.: PCT/CN2019/094111
§ 371 (c)(1),
(2) Date: Apr. 29, 2020

(87) PCT Pub. No.: WO2020/107889
PCT Pub. Date: Jun. 4, 2020

(65) Prior Publication Data
US 2021/0041402 A1  Feb. 11, 2021

(30) Foreign Application Priority Data
Nov. 27, 2018 (CN) .......................... 201811425926.X

(51) Int. Cl.
*G01N 29/04* (2006.01)
*G08C 17/02* (2006.01)
(Continued)

(52) U.S. Cl.
CPC ........... *G01N 29/225* (2013.01); *B66D 1/485* (2013.01); *G01N 29/041* (2013.01); *G08C 17/02* (2013.01);
(Continued)

(58) Field of Classification Search
CPC ......... G01N 2291/0234; G01N 29/041; G01N 2291/0289; G01N 29/225; B66D 1/485; G08C 17/02
(Continued)

(56) References Cited

U.S. PATENT DOCUMENTS

| 4,597,294 A | 7/1986 | Brill, III et al. | |
| 6,161,995 A * | 12/2000 | Wakazono | B23Q 1/015 408/234 |

(Continued)

FOREIGN PATENT DOCUMENTS

| CN | 102445396 B * | 4/2013 | ............... G01N 3/32 |
| CN | 104807887 | 7/2015 | |

(Continued)

OTHER PUBLICATIONS

Gao Chong et al., "Research on the flaw detection of the main shaft of mine hoi", Science and Technology, vol. 1, Issue 27, Jan. 2017, with English abstract, pp. 1-2.
(Continued)

*Primary Examiner* — Jacques M Saint Surin
(74) *Attorney, Agent, or Firm* — JCIPRNET

(57) ABSTRACT

Disclosed are an online monitoring system for a crack on a hoist spindle and an operation method thereof. The system comprises: a rope power part, a crack detection part, a wireless transmission part, and a computer. The rope power part comprises two traction ropes, two guide wheels, two stepper motors, and two stepper motor drivers. The crack detection part comprises a spiral tube guide rail, a sliding
(Continued)

US 10,989,695 B2

Page 2 body, and an ultrasonic generator. The wireless transmission part comprises three zigbee wireless sensing modules. The zigbee wireless sensing modules receive instructions from the computer and transmit the instructions to the stepper motor drivers to control the motors to rotate. The stepper motors drive the guide wheels to rotate to realize the winding of the ropes, so as to pull the sliding body to slide on the spiral tube guide rail. The ultrasonic generator clamped on the sliding body monitors the rotating spindle along the spiral tube guide rail. The zigbee wireless sensing modules transmit the detected data to the computer in real time. The present invention can effectively monitor a hoist spindle in time before a failure occurs, thereby avoiding safety accidents.

5 Claims, 3 Drawing Sheets

(51) Int. Cl.
*B66D 1/48* (2006.01)
*G01N 29/22* (2006.01)
(52) U.S. Cl.
CPC ............... *G01N 2291/0234* (2013.01); *G01N 2291/0289* (2013.01)
(58) Field of Classification Search
USPC .......................................................... 73/618
See application file for complete search history.

(56) References Cited

U.S. PATENT DOCUMENTS

| 10,352,830 | B2 * | 7/2019 | Yu ........................... G01N 29/24 |
| 2016/0209375 | A1 * | 7/2016 | Yamaoka ............. G01N 29/043 |
| 2017/0219530 | A1 | 8/2017 | Borigo et al. |

FOREIGN PATENT DOCUMENTS

| CN | 106482782 | | 3/2017 | |
| CN | 106762343 A | * | 5/2017 | ............. F03B 11/00 |
| CN | 207081698 | | 3/2018 | |
| CN | 108535359 | | 9/2018 | |
| CN | 109557179 | | 4/2019 | |
| CN | 209280023 U | * | 8/2019 | ............. G01D 21/02 |
| WO | 2006030787 | | 3/2006 | |

OTHER PUBLICATIONS

Wang Xingliang et al., "A New Method for Detecting Cracks in Keyway of Mine Hoist", Jiangsu Coal, vol. 3, Jun. 1998, with English abstract, pp. 1-3.
Fu Chuntai, "Discussion on Non-destructive Testing of Main Shaft of Coal Mine in Service Hoist", Coal , vol. 8, Aug. 2009, with English abstract, pp. 1-4.
"International Search Report (Form PCT/ISA/210) of PCT/CN2019/094111," dated Sep. 30, 2019, pp. 1-5.

* cited by examiner

ONLINE MONITORING SYSTEM FOR CRACK ON HOIST SPINDLE AND OPERATION METHOD THEREOF

CROSS-REFERENCE TO RELATED APPLICATION

This application is a 371 of international application of PCT application serial no. PCT/CN2019/094111, filed on Jul. 1, 2019, which claims the priority benefit of China application no. 201811425926.X, filed on Nov. 27, 2018. The entirety of each of the above mentioned patent applications is hereby incorporated by reference herein and made a part of this specification.

FIELD OF THE INVENTION

The present invention relates to the field of crack monitoring, and in particular, to an online monitoring system for a crack on a hoist spindle.

DESCRIPTION OF RELATED ART

At present, most coal wells in China are shallow wells, with the depth of 500-800 m in the ground. However, coal resources buried at depths of 1000-2000 m account for about 53% of the total reserves. It is necessary to use a kilometer deep well hoisting system (including a hoist, a hoisting container, and a hoisting wire rope, etc.). As a main bearing component of the hoist, a spindle bears all the torque for hoisting and lowering a load, and also withstands the tension of wire ropes on both sides. As the depth of the well reaches more than a kilometer, the maximum static tension of the hoist and the number of winding layers of the spindle drum are greatly increased, which causes the wire ropes to generate a winding pressure on the drum that is much larger than the existing structure, and the tension and torque of the wire ropes acting on the spindle are also significantly increased. The static load of the hoist terminal is 240 t or more and the economic hoisting speed is 20 m/s or more when the well depth is 2000 m. The huge dynamic load thus generated seriously endangers the service life of the spindle. Therefore, it is necessary to carry out online monitoring on cracks on the spindle of the kilometer deep well hoist.

It is difficult to monitor cracks on a spindle section inside a hoist drum online due to the following three reasons: the spindle speed of the hoist is 81 rad/s or more; the internal space of the drum is narrow, so that it is difficult to install a monitoring device; and tangling and knotting of data lines easily occur in wired transmission.

SUMMARY OF THE INVENTION

An objective of the present invention is to provide an online monitoring system for a crack on a hoist spindle, which is intended to solve the technical problem that the existing online crack monitoring system cannot monitor cracks of a spindle section inside a drum.

To achieve the foregoing objective, the present invention adopts the following technical solution:

An online monitoring system for a crack on a hoist spindle, disposed inside a drum, comprising:

a crack detection part, configured to detect a crack on a hoist spindle and comprising a spiral tube guide rail, wherein the spiral tube guide rail is axially sleeved outside a spindle section of the hoist along the hoist spindle and is fixed relative to the hoist spindle; a sliding body is slidably disposed on the spiral tube guide rail; two sides of the sliding body are respectively drivingly connected to a rope traction member by means of a rope; the rope traction member comprises a first rope traction member and a second rope traction member; and the two rope traction members are configured to drive the sliding body to move back and forth on the spiral tube guide rail;

the sliding body comprises a curved pipe, an outer shell, and a thin-wall connecting portion, wherein the curved pipe is a curved hollow pipe having a diameter smaller than an inner diameter of the spiral tube guide rail; the curved pipe passes through the interior of the spiral tube guide rail; a through groove is disposed on one side of the spiral tube guide rail that faces outward; one end of the thin-wall connecting portion is fixedly connected to the curved pipe, and the other end is connected to the outer shell through the through groove; a bolt for fixing the rope is disposed on the thin-wall connecting portion; an ultrasonic generator for transmitting ultrasonic waves to the hoist spindle is mounted at the bottom of the outer shell; and the ultrasonic generator is configured to detect the crack on the hoist spindle; and a wireless transmission part comprising three zigbee wireless sensing modules, wherein a signal input end of a first zigbee module is connected to a signal output end of the first rope traction member;

a signal input end of a second zigbee module is connected to a signal output end of the second rope traction member;

a signal input end of a third zigbee module is connected to a signal output end of the ultrasonic generator;

a signal output end of the first zigbee module, a signal output end of the second zigbee module, and a signal output end of the third zigbee module are all connected to a signal input end of a computer; and a signal output end of the computer is connected to a signal input end of the first rope traction member and a signal input end of the second rope traction member, respectively.

Bolts for fixing the rope are disposed at both ends of the thin-wall connecting portion.

The first rope traction member and the second rope traction member have the same structure, and each comprises: a stepper motor driver, a stepper motor, and a rope guide wheel, wherein the stepper motor driver is mounted at a web plate, the rope guide wheel is connected to a rotating shaft of the stepper motor, the rope guide wheel is fixedly connected to one end of the rope, and the other end of the rope is connected to one side of the sliding body.

The left end of the spiral tube guide rail is sleeved with one end of a first rail joint, and the other end of the first rail joint is fixedly connected to a cylindrical welded joint of a left web plate of the hoist. The right end of the spiral tube guide rail is connected to one end of the second rail joint, and the other end of the second rail joint is fixedly connected to a cylindrical welded joint of a right web plate of the hoist.

The three zigbee wireless sensing modules comprise an antenna that extends outward through a hole in the web plate during installation to avoid the effect of metals on wireless sensing.

The present invention further discloses an operation method based on the online monitoring system for a crack on a hoist spindle, wherein a first zigbee module receives an instruction from a computer and then transmits the instruction to a first stepper motor driver, and a first stepper motor drives a first guide wheel to rotate in the forward direction, so that the winding of a first traction rope pulls a sliding body to spirally slide to the left on a spiral tube guide rail, an ultrasonic generator clamped on the sliding body monitors the rotating spindle along the spiral tube guide rail, and a third zigbee module embedded in the ultrasonic generator transmits monitored data to the computer in real time;

the computer sends a reverse instruction to a second zigbee module when the sliding body slides to the leftmost end of the spiral tube guide rail, the second zigbee module transmits the instruction to a second stepper motor driver, and a second stepper motor drives a second guide wheel to rotate in the reverse direction, so that the winding of a second traction rope pulls the sliding body to spirally slide to the right on the spiral tube guide rail, and the ultrasonic generator clamped on the sliding body monitors the rotating spindle along the spiral tube guide rail until the sliding body slides to the rightmost end of the spiral tube guide rail, and through this cyclic process, real-time monitoring of the hoist spindle is realized.

Advantages and positive effects of the present invention are as follows.

1) The online monitoring system for a crack on a hoist spindle of the present invention can monitor cracks on a spindle section inside a drum online, and can timely and effectively warn about further expansion of the cracks, avoiding safety accidents and loss of life and property.

2) A rope power portion separates a power device from a sliding body mechanism, which can reduce the weight of the sliding body, and can also meet the requirement for a small size of the sliding body in a narrow space of a small pitch of the spiral tube guide rail.

3) The zigbee wireless sensing module makes transmission of computer instructions more convenient, and avoids tangling and knotting of data lines due to rotation of a spindle.

DETAILED DESCRIPTION OF THE INVENTION

Figure 1:
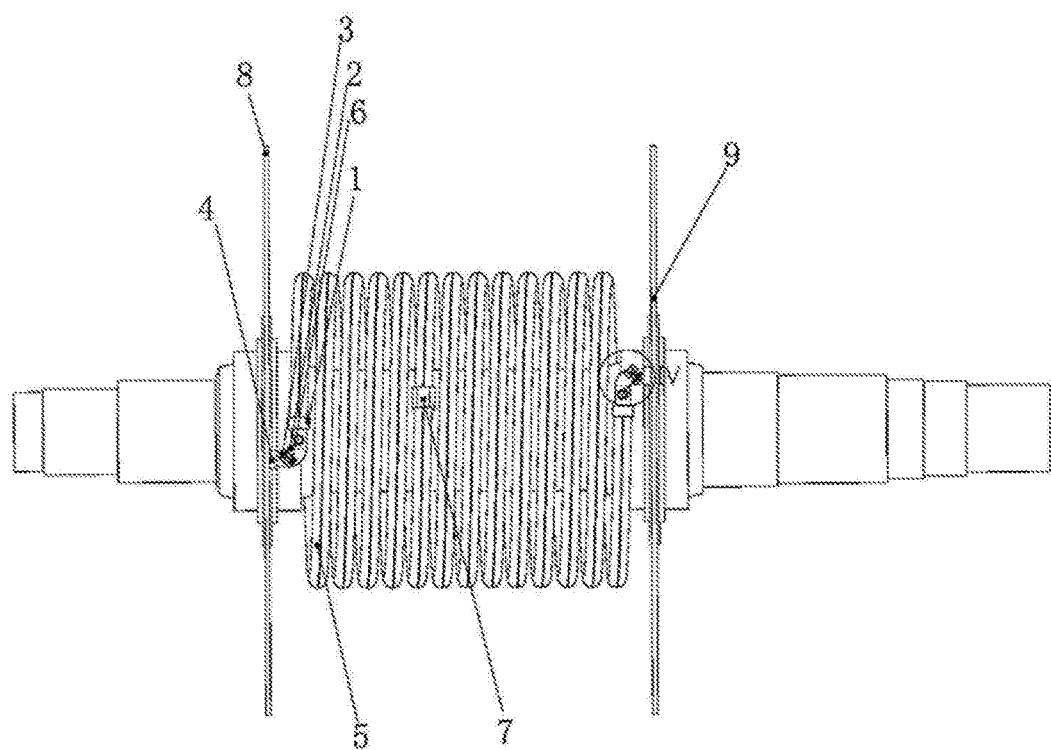
FIG. 1 is a schematic diagram showing the overall structure of an online monitoring system for a crack on a hoist spindle according to the present invention.

FIG. 1 is a schematic diagram showing the overall structure of an online monitoring system for a crack on a hoist spindle according to the present invention.

In the figure, 1: first rail joint 2: first traction rope; 3: first guide wheel; 4: first cylindrical welded joint; 5: spiral tube guide rail; 6: first stepper motor; 7: sliding body; 8: left web plate; 9: right web plate.

Figure 2:
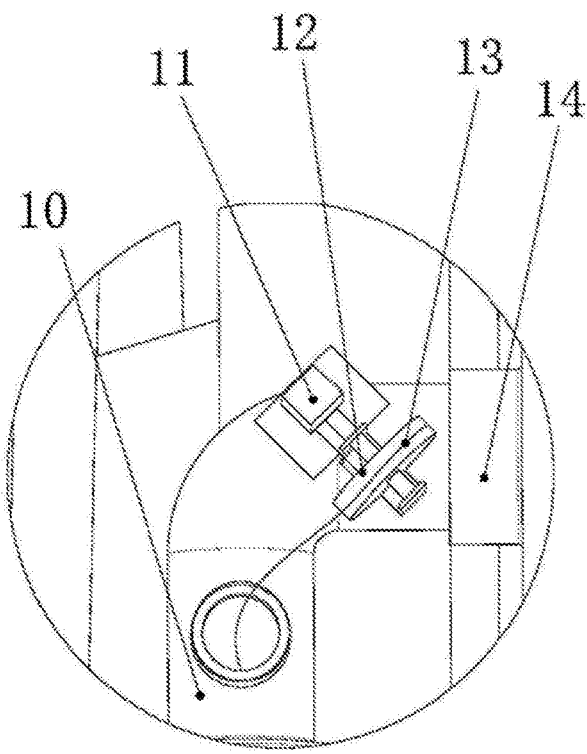
FIG. 2 is a schematic partial enlarged view of FIG. 1.

FIG. 2 is a schematic partial enlarged view of FIG. 1.

In the figure, 10: second rail joint 11: second stepper motor; 12: second guide wheel; 13: second traction rope; 14: second cylindrical welded joint.

Figure 3:
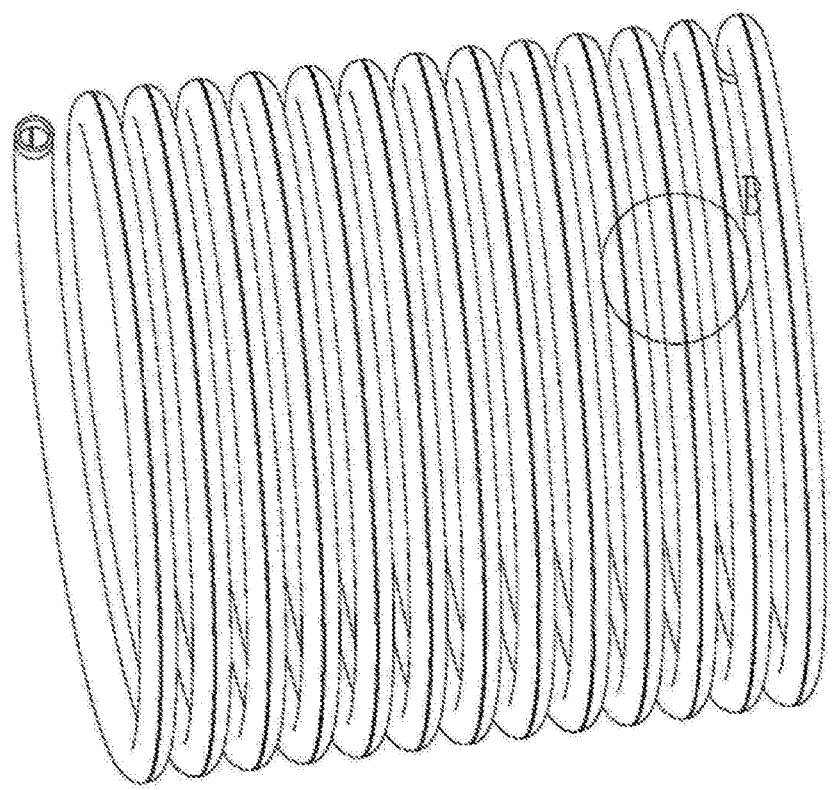
FIG. 3 is a schematic structural diagram of a spiral tube guide rail according to the present invention.

FIG. 3 is a schematic structural diagram of a spiral tube guide rail according to the present invention.

Figure 4:
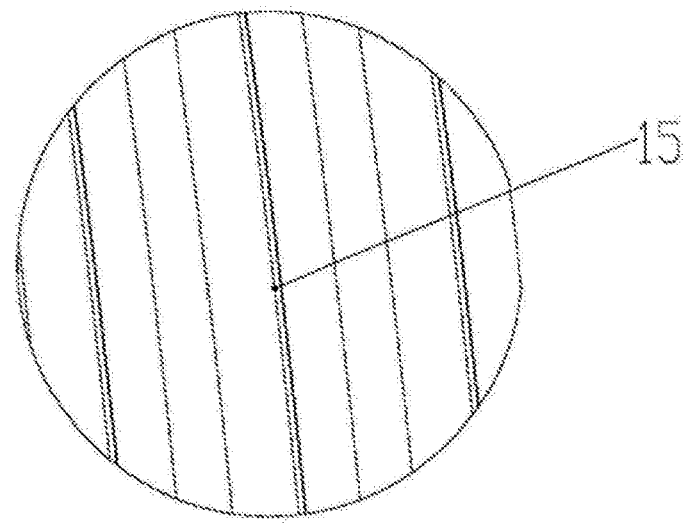
FIG. 4 is a schematic partial enlarged view of FIG. 3.

FIG. 4 is a schematic partial enlarged view of FIG. 3.

In the figure, 15: through groove.

Figure 5:
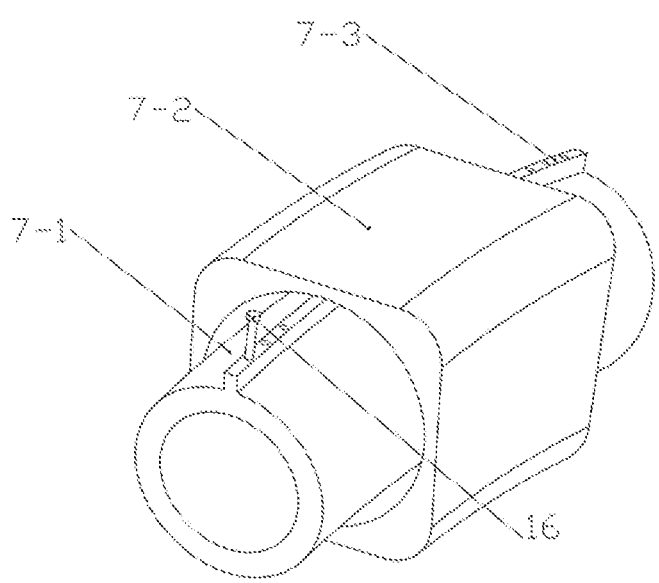
FIG. 5 is a schematic structural diagram of a sliding body according to the present invention.

FIG. 5 is a schematic structural diagram of a sliding body according to the present invention.

In the figure, 7-1: curved pipe; 7-2: outer shell; 7-3: thin-wall connecting portion; 16: bolt.

The present invention is further described below with reference to the accompanying drawings and embodiments.

FIG. 1 is a schematic diagram showing the overall structure of an online monitoring system for a crack on a hoist spindle according to the present invention.

In this embodiment, online monitoring is performed on a crack of a spindle section inside the JK-2.5/20E single-tube single-rope-winding hoist drum, and a crack monitoring system is installed inside the drum and includes a rope power part, a crack detection part, and a wireless transmission part. The rope power part includes:

two traction ropes, two guide wheels, two stepper motors, two stepper motor drivers, and two rail joints. The left end of a first traction rope 2 is fixed to a first guide wheel 3 by means of a bolt on an end face of the guide wheel, and the right end of the first traction rope 2 passes through a through hole on the upper end of the first rail joint 1, and then is fixed to a sliding body 7 by means of a bolt at the left end of the sliding body 7.

The right end of a second traction rope 13 is fixed to a second guide wheel 12 by means of a bolt on an end face of the guide wheel, and the left end of the second traction rope 13 passes through a through hole on the upper end of a second rail joint 10, and then is fixed to the sliding body 7 by means of a bolt at the right end of the sliding body 7.

Two stepper motor drivers mounted at the left and right web plates respectively drive two stepper motors, i.e., a first stepper motor 6 and a second stepper motor 11, wherein the first stepper motor 6 drives the first guide wheel 3 to rotate in the forward direction to realize the winding of the first traction rope 2, and the second stepper motor 11 drives the second guide wheel 12 to rotate in the reverse direction to realize the winding of the second traction rope 13.

The crack detection part includes a spiral tube guide rail, a sliding body 7, and an ultrasonic generator, wherein the sliding body 7 tied by two ropes is sleeved on the spiral tube guide rail, the left end of the spiral tube guide rail is sleeved on the first rail joint 1, the other end of the first rail joint 1 is sleeved on a first cylindrical welded joint 4 of a left web plate of the hoist, the right end of the spiral tube guide rail is sleeved on the second rail joint 10, the other end of the second rail joint 10 is sleeved on a second cylindrical welded joint 14 of a right web plate of the hoist, and the ultrasonic generator is fixed to the bottom of the sliding body 7 by means of bolts.

The wireless transmission part includes three zigbee wireless sensing modules. An interface of a first zigbee module is connected in series to an interface of a first stepper motor driver. An interface of a second zigbee module is connected in series to an interface of a second stepper motor driver. An interface of a third zigbee module is connected in series to an interface of the ultrasonic generator. The first zigbee module receives an instruction from a computer and transmits the instruction to the first stepper motor driver to drive the first stepper motor to rotate in the forward direction. The second zigbee module receives an instruction from the computer and transmits the instruction to the second stepper motor driver to drive the second stepper motor to rotate in the reverse direction. The third zigbee module transmits data measured by the ultrasonic generator to the computer in real time.

The spiral tube guide rail is a tubular spiral tube guide rail having a through groove at the periphery. The peripheral through groove is communicated with the interior of the tubular spiral tube guide rail, and functions to connect the interior of the sliding body 7 to the exterior of the sliding body 7.

The sliding body 7 includes a curved pipe 7-1, an outer shell 7-2, and a thin-wall connecting portion 7-3, wherein the curved pipe 7-1 is a curved hollow pipe having a diameter smaller than an inner diameter of the spiral tube guide rail, the curved pipe 7-1 passes through the interior of the spiral tube guide rail, a through groove is disposed on one side of the spiral tube guide rail that faces outward, one end of the thin-wall connecting portion 7-3 is fixedly connected to the curved pipe 7-1, and the other end is connected to the outer shell 7-2 through the through groove, a bolt 16 for fixing the rope is disposed on the thin-wall connecting portion 7-3, an ultrasonic generator for transmitting ultrasonic waves to the hoist spindle is mounted at the bottom of the outer shell 7-2, and the ultrasonic generator is configured to detect the crack on the hoist spindle.

As a further preferred version of the technical solution of the present invention, the zigbee wireless sensing module comprises an antenna that extends outward through a hole in the web plate during installation to avoid the effect of metals on wireless sensing.

As a further preferred version of the technical solution of the present invention, the zigbee wireless sensing module includes a first zigbee module and a second zigbee module. The first zigbee module and the second zigbee module simultaneously receive instructions from the computer, so that the forward rotation of the first stepper motor and the reverse rotation of the second stepper motor occur simultaneously.

Portions that are not described in detail in the present invention are well-known techniques to those skilled in the art.

What is claimed is:

1. An online monitoring system for a crack on a hoist spindle, disposed inside a drum, comprising:
    a crack detection part, configured to detect the crack on the hoist spindle and comprising a spiral tube guide rail, wherein the spiral tube guide rail is axially sleeved outside a spindle section of a hoist along the hoist spindle and is fixed relative to the hoist spindle; a sliding body is slidably disposed on the spiral tube guide rail; two sides of the sliding body are respectively drivingly connected to a rope traction member by means of a rope; the rope traction member comprises a first rope traction member and a second rope traction member; and the first rope traction member and the second rope traction member are configured to drive the sliding body to move back and forth on the spiral tube guide rail;
    the sliding body comprises a curved pipe, an outer shell, and a thin-wall connecting portion, wherein the curved pipe is a curved hollow pipe having a diameter smaller than an inner diameter of the spiral tube guide rail; the curved pipe passes through the interior of the spiral tube guide rail; a through groove is disposed on one side of the spiral tube guide rail that faces outward; one end of the thin-wall connecting portion is fixedly connected to the curved pipe, and the other end of the thin-wall connecting portion is connected to the outer shell through the through groove; a bolt for fixing the rope is disposed on the thin-wall connecting portion; an ultrasonic generator for transmitting ultrasonic waves to the hoist spindle is mounted at the bottom of the outer shell; and the ultrasonic generator is configured to detect the crack on the hoist spindle; and
    a wireless transmission part comprising three zigbee wireless sensing modules, wherein a signal input end of a first zigbee module is connected to a signal output end of the first rope traction member;
    a signal input end of a second zigbee module is connected to a signal output end of the second rope traction member;
    a signal input end of a third zigbee module is connected to a signal output end of the ultrasonic generator;
    a signal output end of the first zigbee module, a signal output end of the second zigbee module, and a signal output end of the third zigbee module are all connected to a signal input end of a computer; and
    a signal output end of the computer is connected to a signal input end of the first rope traction member and a signal input end of the second rope traction member, respectively.

2. The online monitoring system for a crack on a hoist spindle according to claim 1, wherein the first rope traction member and the second rope traction member have the same structure, and each of the first rope traction member and the second rope traction member comprises: a stepper motor driver, a stepper motor, and a rope guide wheel, wherein the stepper motor driver is mounted at a web plate; the rope guide wheel is connected to a rotating shaft of the stepper motor; the rope guide wheel is fixedly connected to one end of the rope, and the other end of the rope is connected to one side of the sliding body.

3. The online monitoring system for a crack on a hoist spindle according to claim 1, wherein the left end of the spiral tube guide rail is sleeved with one end of a first rail joint, and the other end of the first rail joint is fixedly connected to a cylindrical welded joint of a left web plate of the hoist; the right end of the spiral tube guide rail is connected to one end of the second rail joint, and the other end of the second rail joint is fixedly connected to a cylindrical welded joint of a right web plate of the hoist.

4. The online monitoring system for a crack on a hoist spindle according to claim 1, wherein the three zigbee wireless sensing modules comprise an antenna that extends outward through a hole in the web plate during installation to avoid the effect of metals on wireless sensing.

5. An operation method based on the online monitoring system for a crack on a hoist spindle according to claim 1, wherein a first zigbee module receives an instruction from a computer and then transmits the instruction to a first stepper motor driver; and a first stepper motor drives a first guide wheel to rotate in the forward direction, so that the winding of a first traction rope pulls a sliding body to spirally slide to the left on a spiral tube guide rail, an ultrasonic generator clamped on the sliding body monitors the rotating spindle along the spiral tube guide rail, and a third zigbee module embedded in the ultrasonic generator transmits monitored data to the computer in real time;
    the computer sends a reverse instruction to a second zigbee module when the sliding body slides to the leftmost end of the spiral tube guide rail, the second zigbee module transmits the instruction to a second stepper motor driver, and a second stepper motor drives a second guide wheel to rotate in the reverse direction, so that the winding of a second traction rope pulls the sliding body to spirally slide to the right on the spiral tube guide rail, and the ultrasonic generator clamped on the sliding body monitors the rotating spindle along the spiral tube guide rail until the sliding body slides to the rightmost end of the spiral tube guide rail, and through this cyclic process, real-time monitoring of the hoist spindle is realized.

* * * * *